United States Patent [19]
Bechtold et al.

[11] 3,852,366
[45] Dec. 3, 1974

[54] A COMPOSITION OF ISOMERIC TRICHLORODIFLUOROBENZENES

[75] Inventors: Max Fredrick Bechtold, Kennett Square; Charles William Tullock, Landenberg, both of Pa.

[73] Assignee: E. I. du Pont de Nemours and Company, Wilmington, Del.

[22] Filed: Sept. 17, 1973

[21] Appl. No.: 397,724

Related U.S. Application Data

[62] Division of Ser. No. 172,513, Aug. 17, 1971, Pat. No. 3,774,393.

[52] U.S. Cl............................................ 260/650 F
[51] Int. Cl............................................ C07c 25/00
[58] Field of Search .................... 260/650 F; 252/67

[56] References Cited
OTHER PUBLICATIONS

Yakobson et al., Chem. Abstracts 66, 94740d, 94741e, (1966).

Finger et al., Chem. Abstracts 45, 7033g, (1951).

*Primary Examiner*—Daniel D. Horwitz
*Attorney, Agent, or Firm*—D. R. J. Boyd

[57] ABSTRACT

Hydrochlorofluorobenzenes defined by $C_6H_aCl_bF_c$ wherein $a$ is 1 to 3, $b$ is 2 to 4 and $c$ is 1 to 3 with $a + b + c = 6$ and $a + b = 3$ to 5, and mixtures thereof can be used to generate power in a Rankine-cycle engine. The compounds are surprisingly thermally stable and have low toxicity.

1 Claim, 2 Drawing Figures

PATENTED DEC 31 1974 3,852,365

COMPOSITION OF ISOMERIC TRICHLORODIFLUOROBENZENES

RELATED APPLICATION

This application is a division of application U.S. Ser. No. 172,513 filed Aug. 17, 1971, now Pat. No. 3,774,393.

FIELD OF THE INVENTION

This invention relates to a method of generating power using the Rankine cycle. More particularly, this invention relates to the use of novel power fluids in Rankine-cycle engines.

THE PRIOR ART

External combustion engines operating on the Rankine cycle, typified by steam engines, offer a number of advantages over internal combustion engines, including a broader selection of fuel sources and lower atmospheric pollution. For relatively small, and particularly for portable units, water, which is the logical power fluid, is not particularly suitable due to the superheat required for avoidance of vapor droplets, and the difficulty of engine freeze-up in winter. Also, in turbines because the molecular weight of water is low, high efflux velocities are required which render it impractical to use single-stage turbines. Then there is a substantial need for higher-molecular-weight fluids which have a combination of the desirable properties needed for use as a Rankine-cycle power fluid.

SUMMARY OF THE INVENTION

The present invention can be defined as a method of generating power in which a working substance is heated and vaporized, does work in a prime mover and after doing said work is condensed and recycled, wherein the working substance consists essentially of at least one halogenated benzene compound having the formula $C_6H_aCl_bF_c$, in which $a$ is 1 to 3, preferably 1 to 2; $b$ is 2 to 4, preferably 3 to 4; and $c$ is 1 to 3, preferably 1 to 2; and wherein $a + b + c = 6$ and $a + b = 3$ to 5, preferably 4 to 5.

The compounds employed therein include:

| | |
|---|---|
| $C_6HCl_4F$ | (3 isomers) |
| $C_6HCl_3F_2$ | (6 isomers) |
| $C_6H_2Cl_3F$ | (6 isomers) |
| $C_6HCl_2F_3$ | (6 isomers) |
| $C_6H_2Cl_2F_2$ | (11 isomers) |
| $C_6H_3Cl_2F$ | (6 isomers) |

While the pure isomers of the above compounds can be employed in the practice of this invention, it is generally desirable to employ mixtures, which are generally obtained as the products of synthesis. In general, all of the isomers of a given compound boil in a narrow range of temperatures (about ±2°C) and such mixtures generally exhibit a lower melting point than the pure isomers, which is of advantage in operating the engine. However, unlike water, which expands on freezing, the compounds above contract, so that solidification of the working substance in the boiler and condenser when the engine is not in use does not cause mechanical damage.

THE DRAWINGS AND DETAILED DESCRIPTION OF THE INVENTION

This invention will be better understood by reference to the drawings which accompany this specification. In the drawings.

Figure 1:
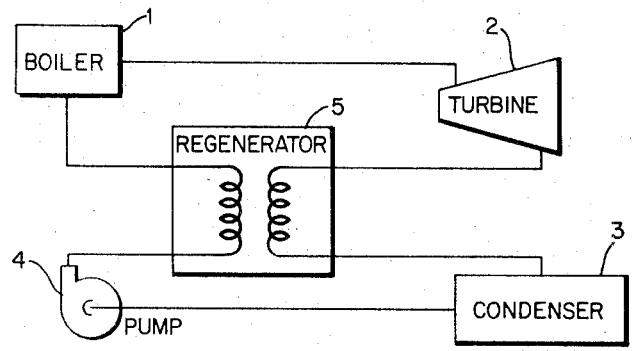
FIG. 1 is a diagram showing the various stages of a Rankine cycle, including an optional regeneration step to optimize the efficiency.

Turning now to FIG. 1, the working substance is evaporated in the boiler 1. This boiler can be any conventional form of boiler. Boilers of the rotating type wherein the liquid is distributed over a large surface by centrifugal force are particularly efficient thermally and produce high quality vapor. Such boilers are preferred for use with the working substances of the present invention. The vapor then passes to a prime mover such as a turbine 2 when it expands in the turbine nozzles and is employed to run an impulse turbine. The vapor can then be passed to a condenser 3 when it is condensed back into the liquid phase. The liquid is then pumped back to the boiler 1 by pump 4 and thus recycled. With the liquids of the present invention, small air-cooled condensers of high efficiency can be employed. It is, therefore, desirable to employ a condenser of smaller diameter attached to and rotating with the boiler. The liquid can then be pumped from the condenser to the boiler by centrifugal force. The construction of a particularly preferred system employing a rotating boilder and condenser is taught in the copending commonly assigned patent applications of William A. Doerner, U.S. Pat. No. 3,590,786; and U.S. Pat. No. 3,613,368.

Expansion of the vapor in the prime mover is essentially isentropic. The vapor of the working substances of this invention becomes superheated upon expansion. The efficiency of the cycle can, therefore, be improved by passing the exhaust from the turbine employed as a prime mover through a regenerator 5 wherein the excess heat is removed from the vapor and transferred to the boiler feed as taught by U.S. Pat. No. 3,040,528.

Figure 2:
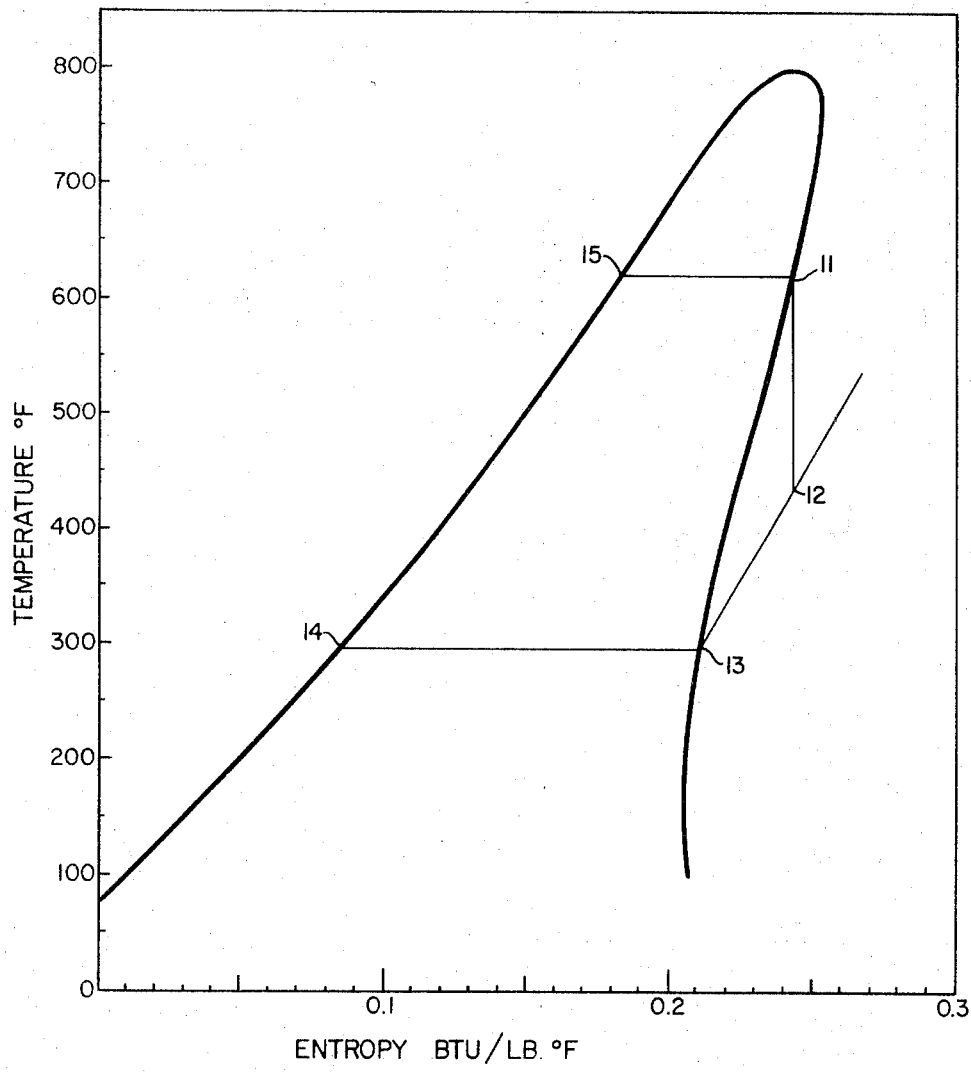
FIG. 2 is a temperature-entropy diagram for a mixture of isomers of trichlorodifluorobenzene.

In FIG. 2 there is shown the temperature-entropy diagram for a mixture of isomers of trichlorodifluorobenzene, one of the compositions useful as working fluids in Rankine-cycle engines according to the present invention. This mixture contains:

| | | |
|---|---|---|
| I | 1,3,5-trichloro-2,4-difluorobenzene | 12.2% |
| II | 1,2,4-trichloro-3,5-difluorobenzene | 58.2% |
| III | 1,2,3-trichloro-4,5-difluorobenzene | 6.3% |
| IV | 1,2,5-trichloro-3,4-difluorobenzene | 15.6% |
| V | 2,3,4-trichloro-1,5-difluorobenzene | 6.8% |
| VI | 1,3,4-trichloro-2,5-difluorobenzene | 0.9% |

Power is generated by expansion of the mixture from vapor at a temperature of 621°F, 150 psia, point 11 on the diagram, in aa turbine. Expansion is essentially isentropic and the working fluid is cooled, following the line from 11 to 12 to a temperature of 433°F and 3 psia, the condenser pressure. The vapor is then cooled at 3 psia, pressure from 433°–296.8°F, the condenser temperature following the line from 12 to 13. The cooling can be conducted in the condenser, but it is preferably conducted in a regenerator. The vapor is then condensed to liquid in the condenser, following the line from 13 to 14 in FIG. 2. The liquid is then pumped to 150 psia and fed to the boiler, optionally passing in heat-exchanging relationship with the efflux from the turbine in the regenerator. By means of the regeneration heat, if employed, and the boiler, the liquid is heated to 621°F at 150 psia, point 15 on the curve, then vaporized following the line from 15 to 11 to complete the cycle.

For the above mixture in this cycle, the following enthalpy values in relation to the liquid at the condenser temperature of 296.8°F and pressure, 3 psia have been calculated.

| POINT | PRESSURE P.S.I.A. | TEMP. °F | ENTHALPY B.T.U./LB. |
|---|---|---|---|
| 11 | 150.16 | 621 | 154.97 = $H_1$ |
| 12 | 3.00 | 433 | 122.00 = $H_2$ |
| 13 | 3.00 | 296.8 | 95.271 = $H_3$ |
| 14 | 3.00 | 296.8 | 0.000 = $H_4$ |

The indicated Rankine-cycle thermal efficiency ($\eta$ cycle) is given by $$\eta\text{cycle} = [H_1-H_2/H_1-H_4-r(H_2-H_3)] \times 100\%,$$

wherein $r$ is the regeneration factor, i.e., the fraction of heat recovered by regeneration. With no regeneration, the above mixture of trichlorodifluorobenzenes has an efficiency in Rankine-cycle engines given by $\eta$cycle = 21.2%. With 70% regeneration, the Rankine-cycle efficiency is increased to $\eta$cycle = 24.14%. The above mixture of isomers of trichlorodifluorobenzene can be made by heating pentachlorobenzene with potassium fluoride in sulfolane (tetramethylene sulfone). The mixture has a critical temperature of 427°C (800.7°F), a critical pressure of 522.4 psia, a boiling point of 203°C (397.4°F) and a freezing point of about −40°C (−40°F).

If desired, the pure isomers can be isolated from the mixture by conventional methods of separation. All of the isomers have essentially the same boiling point and critical temperature. The melting points, however, vary: isomer II melts at −13°C and isomer IV melts at about −25°C. Isomer I melts at 15.5°C, III at 28°C, V at 50.5°C and isomer VI at −5°C.

Of the pure isomers, the novel compound IV, 1,2,5-trichloro-3,4-difluorobenzene, which has the lowest melting point, also has exceptional heat stability.

The above results are typical of the working fluids of the present invention.

For use as working fluids in Rankine-cycle engines, a combination of desirable properties is required. The most important of these properties are:

Thermal Stability in Contact with the Usual Materials of Engine Construction

This is necessary to permit prolonged operation in a closed system. In particular, any decomposition generating noncondensable gases would blanket and inactivate the condenser or require a constant purging device. Further, decomposition of the working fluid should not produce insulating solid deposits in valves, nozzles, seals or on heat-exchanging surfaces.

The working fluids of the present invention have surprising thermal stability and are suitable for use at boiler temperatures of 350°C.

Low Toxicity

The working fluids are preferably such that inhalatin of vapors from accidental breakage or spills should not be damaging to health.

The working fluids of the present invention are essentially nontoxic in acute inhalation tests. For example, in a typical test, six ChR-CD male rats, each weighing 250–300 g, were exposed to the test material in a 20-liter exposure chamber for 4 hours. The test material was metered at a uniform rate by a syringe drive into a stainless steel T tube heated to 150°–175°C through which air was passed to give a concentration of about 1,245 ppm and fed to the exposure chamber. The exposed rats were kept 14 days after treatment for observation. During treatment, the rats exhibited lachrimation and salivation, with face-pawing and gasping. After exposure, the rats had a normal weight gain (against a control of untreated rats) over the 14-day observation period. No rats died during this period.

Low Flammability

The flammability of the fluids should be as low as possible to minimize the risks of fire.

The working fluids of the present invention do not support combustion.

High Molecular Weight

High molecular weight is particularly beneficial in the construction of low horsepower (i.e., <1,000 h.p.) turbine engines, since it permits operation with a singlestage turbine at reasonable speeds. For this purpose, the molecular weight should be at least 150. The liquids employed in the present invention all have molecular weights of at least 165, and the preferred class of compounds has a molecular weight of at least 199.5.

Boiling Point

A particularly severe problem in the design of Rankine-cycle engines which are intended to be portable is in providing efficient condensation. The working fluids of the present invention boil at temperatures in the range of about 165°–245°C, and for the preferred class of fluids, from about 200–245°C. The above ranges are suitable for use with small, air-cooled condensers. Further, the compounds can be employed in efficient, subcritical Rankine cycles where the boiler pressure is relatively low so that relatively lightweight engines can be constructed.

Liquid Density

As mentioned above, rotary boilers in which the working substance is maintained in the liquid state on an extended cylindrical surface by centrifugal force are particularly useful for small Rankine-cycle engines. Rotary condensers which have smaller diameters than the boiler and rotate therewith can be employed with advantage, and the centrifugal force employed to pump the liquid (optionally through a regenerator) from the condenser to the boiler. The greater the liquid density of the working substance, the smaller the diameter of the boiler (and consequently of the small engine) which is required at a given speed of rotation or, conversely, for a given size of boiler and condenser, the slower the rate of rotation required to achieve efficient operation.

The working fluids of the present invention have liquid densities of about 1.4–1.7 and are suited for use in rotary boilers and condensers.

Freezing Point

The freezing point of fluids employed as working substances in Rankine-cycle engines must be well below the operating temperature of the condenser. Preferably, the fluids should be liquid at ambient temperature, although, in contrast to water, which expands on freezing, organic fluids contract on freezing, and thus will not cause rupture of the condenser tubes.

Synthesis

Some of the compounds employed as working fluids in the present invention are known compounds. Others can be synthesized by a variety of conventional techniques.

For compounds in which a = 1, a mixture of the desired products can be obtained by heating pentachlorobenzene with potassium fluoride in a polar organic solvent such as sulfolane, methyl sulfone, dimethylformamide, 1-methyl-2-pyrrolidone and the like.

Thus, when pentachlorobenzene is heated with potassium fluoride in sulfolane at 233°–255° in a mixture containing the $C_6HCl_4F$ isomers bp 244°C (in about a 35% conversion) and $C_6HCl_3F_2$ mixed isomers bp 203°C (in about a 40% conversion) can be obtained. The mixture can be readily separated into the individual isomer mixtures by fractional distillation. Recovery of the pure isomers can in most cases be achieved by chromatographic methods.

Another method is to heat the pentachlorobenzene with potassium fluoride in the absence of a solvent. At a temperature of 390°C and 10 hours heating a 17% conversion to $C_6HCl_4F$ and 22% conversion to $C_6HCl_3F_2$ is obtained.

For the more highly fluorinated products, partially fluorinated compounds or mixtures thereof can be employed. Thus, on heating $C_6HCl_4F$ (mixed isomers) with KF in sulfolane at 229°–250°C, a 29% conversion to $C_6HCl_2F_3$ and 13% conversion to $C_6HCl_3F_2$ is obtained.

Yet another method is to chlorinate partially fluorinated benzenes by refluxing with $SO_2Cl_2$. For example,

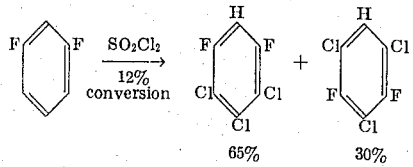

The same reaction yields 54% of

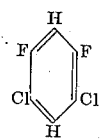

Similarly,

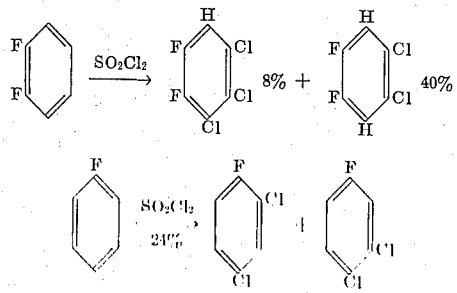

Compounds containing more than one hydrogen can also be made by partial replacement of chlorine in the corresponding chloro compound with fluorine by potassium fluoride

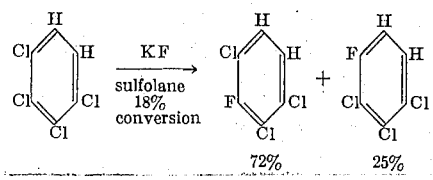

Pure 1,2,4-trichloro-3,5-difluorobenzene may be prepared by the reported literature procedure, G. G. Yakobson, V. E. Platonov, A. K. Petrov, V. S. Kryukova, N. A. Gershtein and N. N. Yorozhtsov, Jr., Zh. Obshch. Khim 36, 2133 (1966); English translation:

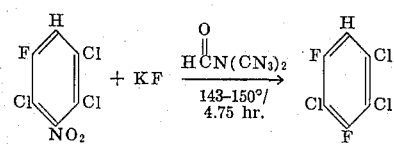

This process yielded the pure $C_6HCl_3F_2$ isomer in a 54% conversion (the reported literature conversion was ~7%).

Another route, which leads to a mixture of the two lowest-melting $C_6HCl_3F_2$ isomers, follows:

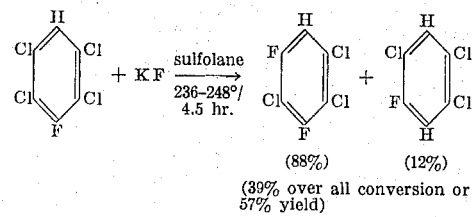

These same two lowest melting isomers are obtained in an 11% conversion (and in a 70%:30% isomer ratio rather than the 88%:12% ratio) together with

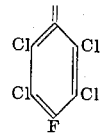

in a 12.5% conversion on heating 1,2,4,5-tetrachloro-3-nitrobenzene with potassium fluoride in sulfolane medium at 208°–231°/1.75 hr.

The following example is provided to illustrate the preparation of the trichlorodifluorobenzenes which are preferred in the practice of this invention.

EXAMPLE

A. Preparation of a Mixture of Isomers of $C_6HCl_3F_2$

In a 2-liter round-bottom flask equipped with a reflux condenser and protected from atmospheric moisture with a tube of "Drierite" there were placed 300 g of pentachlorobenzene, 366 g of anhydrous potassium fluoride and 450 ml of sulfolane (tetramethylenesulfone). The mixture was heated for 4 hours under reflux. The initial pot temperature of 255°C slowly dropped to 233°C during the heating period. The reflux condenser was then replaced with a short still head and the crude product was removed by distillation at 200°–260°C. The crude product thus obtained was steam distilled, and the water-insoluble oil in the distillate amounting to 210 g was separated. Atmospheric pressure distillation through a 17 inch spinning band column yielded 20.7 g of $C_6HCl_2F_3$ mixed isomers, bp 162°–163°C and 111 g of mixed isomers of $C_6HCl_3F_2$, bp 202°–204°C.

Analysis of the trichlorodifluorobenzene mixture by vapor phase chromatography supplemented with nuclear magnetic resonance (F) showed that the mixture contained:

12.2% 1,3,5-trichloro-2,4-difluorobenzene
58.2% 1,2,4-trichloro-3,5-difluorobenzene
6.3% 1,2,3-trichloro-4,5-difluorobenzene
15.6% 1,2,5-trichloro-3,4-difluorobenzene
6.8% 2,3,4-trichloro-1,5-difluorobenzene
0.9% 1,3,4-trichloro-2,5-difluorobenzene B. Partial Separation of the Mixed Isomers A mixture of isomers of $C_6HCl_3F_2$ prepared as described in Part A was partially separated in a preheated gas chromatographic column. The column consisted of a stainless steel tube 8 inches in length, ¾-inch OD and with 0.035 inch wall thickness. The column was packed with diatomaceous earth ["Chromasorb W(NAW)"] of 45–60 mesh with 25% octylphenoxy polyethylene glycol ("Triton X 305"). The temperature of the column was 150°C and a helium flow of 300 ml/min was employed. The sample was injected in an amount of 0.5 ml/pass. The first peak, with a retention time of 42.2 minutes, consisted of essentially pure 1,2,5-trichloro-3,4-difluorobenzene. A second peak with a retention time of 54.6 minutes, consisted of 75% 1,2,4-trichloro-3,5-difluorobenzene, 15% 1,3,5-trichloro-2,4-difluorobenzene and 10% of 1,2,3-trichloro-4,5-difluorobenzene. A third peak with a retention time of 59.7 minutes, consisted of essentially pure 2,3,4-trichloro-1,5-difluorobenzene.

Since obvious modifications and equivalents in the invention will be evident to those skilled in the art, we propose to be bound solely by the appended claims.

We claim:

1. A composition consisting, by weight, of about 12% 1,3,5-trichloro-2,4-difluorobenzene, about 58% 1,2,4-trichloro-3,5-difluorobenzene, about 6% 1,2,3-trichloro-4,5-difluorobenzene, about 16% 1,2,5-trichloro-3,4-difluorobenzene, about 7% 2,3,4-trichloro-1,5-difluorobenzene and about 1% 1,3,4-trichloro-2,5-difluorobenzene.

* * * * *